(12) United States Patent
de Bruin et al.

(10) Patent No.: US 9,015,956 B1
(45) Date of Patent: Apr. 28, 2015

(54) LOW PROFILE SOLAR DRYING TUNNEL

(75) Inventors: Tom de Bruin, SBFZ (PH); Lewis Donovan Strickland, Subic Bay Gateway Park (PH)

(73) Assignee: Grainpro, Inc., Concord, MA (US)

( * ) Notice: Subject to any disclaimer, the term of this patent is extended or adjusted under 35 U.S.C. 154(b) by 463 days.

(21) Appl. No.: 13/444,063

(22) Filed: Apr. 11, 2012

Related U.S. Application Data (60) Provisional application No. 61/474,121, filed on Apr. 11, 2011.

(51) Int. Cl.
| | | |
|---|---|---|
| F26B 19/00 | (2006.01) | |
| F26B 3/32 | (2006.01) | |
| F26B 11/12 | (2006.01) | |
| F26B 21/12 | (2006.01) | |
| B01F 11/00 | (2006.01) | |
| F26B 3/28 | (2006.01) | |
| F26B 23/00 | (2006.01) | |

(52) U.S. Cl.
CPC .. *F26B 3/28* (2013.01); *F26B 23/00* (2013.01)

(58) Field of Classification Search
CPC ............ F26B 3/28; F26B 3/283; F26B 3/286; F26B 19/00; F26B 19/005; H01F 11/00
USPC ............. 34/93, 522, 512, 275, 295, 166, 179, 34/241; 366/275–277, 343–346, 99, 314
See application file for complete search history.

(56) References Cited

U.S. PATENT DOCUMENTS

2005/0241174 A1* 11/2005 Kolega et al. ..................... 34/93

* cited by examiner

*Primary Examiner* — Kenneth Rinehart
*Assistant Examiner* — John McCormack
(74) *Attorney, Agent, or Firm* — Daniel J. Swirsky; Rochel L. Simon; AlphaPatent Associates Ltd.

(57) ABSTRACT

A solar drying tunnel having a low-profile and which is transportable includes a bottom portion, a frame, a cover, and externally controlled rolling mechanism for turning grain over. The tunnel may also include a fan at one end and a chimney at another end to provide enhanced air flow.

16 Claims, 6 Drawing Sheets

LOW PROFILE SOLAR DRYING TUNNEL

CROSS REFERENCE TO RELATED APPLICATIONS

This application claims the benefit under 35 U.S.C. §119 (e) of U.S. Provisional Patent Application Ser. No. 61/474,121 entitled "Low Profile Solar Drying Tunnel," filed on Apr. 11, 2011, the contents of which are incorporated by reference in their entirety for all purposes.

STATEMENT REGARDING FEDERALLY SPONSORED RESEARCH OR DEVELOPMENT

N/A

BACKGROUND OF THE INVENTION

The present invention is directed to a solar drying tunnel with a low profile and which is easily transportable.

In a conventional greenhouse or solar dryer, there is generally a bottom surface and a ceiling that is at a height suitable for human beings to enter. In the case of a grain dryer with a transparent dome, grains may be placed on the bottom surface, and a human being will enter the dryer to turn the grains so that they can dry on all surfaces. The dome is generally transparent so as to provide solar gain, also known as the "greenhouse effect." Conventional greenhouses or similarly designed solar dryers are tall and expensive, and are not transportable.

A transportable system for drying grains or seed is the Collapsible Drying Case (CDC)™ (GrainPro, Inc.). The CDC is made of a heavy-duty black PVC surface as a bottom portion for placing the grains thereon, and, in case of rain, it can be folded halfway so that half the PVC surface acts as a cover that can be zipped onto the other half so that the grains or seeds can be protected during rain. The CDC also includes handles for transport. However, it does not benefit from solar gain since it has no transparent cover. The grains in the CDC are dried in the open air and are turned manually.

BRIEF SUMMARY OF THE INVENTION

There is provided, in accordance with embodiments of the present invention, a solar drying tunnel for drying of grains or seeds. The tunnel includes a flexible bottom portion having a width and length, the bottom portion for placement of grains or seeds thereon, a cover having a transparent material extending over the length of the bottom portion, a frame positioned along the length of the bottom portion and configured for holding the cover thereon, and a rolling mechanism positioned underneath the bottom portion, wherein the rolling mechanism can be externally controlled, and wherein movement of the rolling mechanism provides a moveable ridge in the bottom portion such that the grains or seeds positioned on the bottom portion are caused to turn over as the rolling mechanism is moved.

There is provided, in accordance with additional embodiments of the present invention, a solar drying tunnel for drying of grains or seeds. The solar drying tunnel includes a flexible bottom portion having a width and a length, a cover made of transparent material and extending over the length of the bottom portion, and a frame positioned along the length of the bottom portion and configured for holding the cover thereon, wherein a maximum height of the frame is less than or equal to 60 centimeters.

There is provided, in accordance with yet additional embodiments of the present invention, a method for drying grain. The method includes placing the grain in a low-profile solar drying tunnel, providing a rolling mechanism underneath the low-profile solar drying tunnel, and turning the grain within the low-profile solar drying tunnel by rolling the rolling mechanism.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE SEVERAL VIEWS OF THE DRAWINGS

The above and further advantages of the present invention may be better understood by referring to the following description in conjunction with the accompanying drawings in which.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

This application claims priority to Provisional patent application Ser. No. 61/474,121 entitled "Low Profile Solar Drying Tunnel," filed on Apr. 11, 2011, the contents of which are incorporated by reference in their entirety for all purposes.

In the following detailed description, numerous specific details are set forth in order to provide a thorough understanding of the present invention. It will be understood by those of ordinary skill in the art that embodiments of the present invention may be practiced without these specific details. In other instances, well-known methods, procedures, components and structures may not have been described in detail so as not to obscure the present invention.

Embodiments of the present invention relate to a solar drying tunnel which does not require entry of a human being for turning over the commodity, for example, grain or seeds, during a drying process, thus enabling the tunnel to have a low profile and to be easily transportable while allowing the grain or seed to be remotely turned over during drying. An external access mechanism is provided for moving a portion of the tunnel, thus turning the grains or seeds, thus eliminating the need for a high ceiling or a frequently detachable ceiling, for turning the grain. The tunnel also provides a transparent cover for solar gain to further enhance drying.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

Figure 1A:
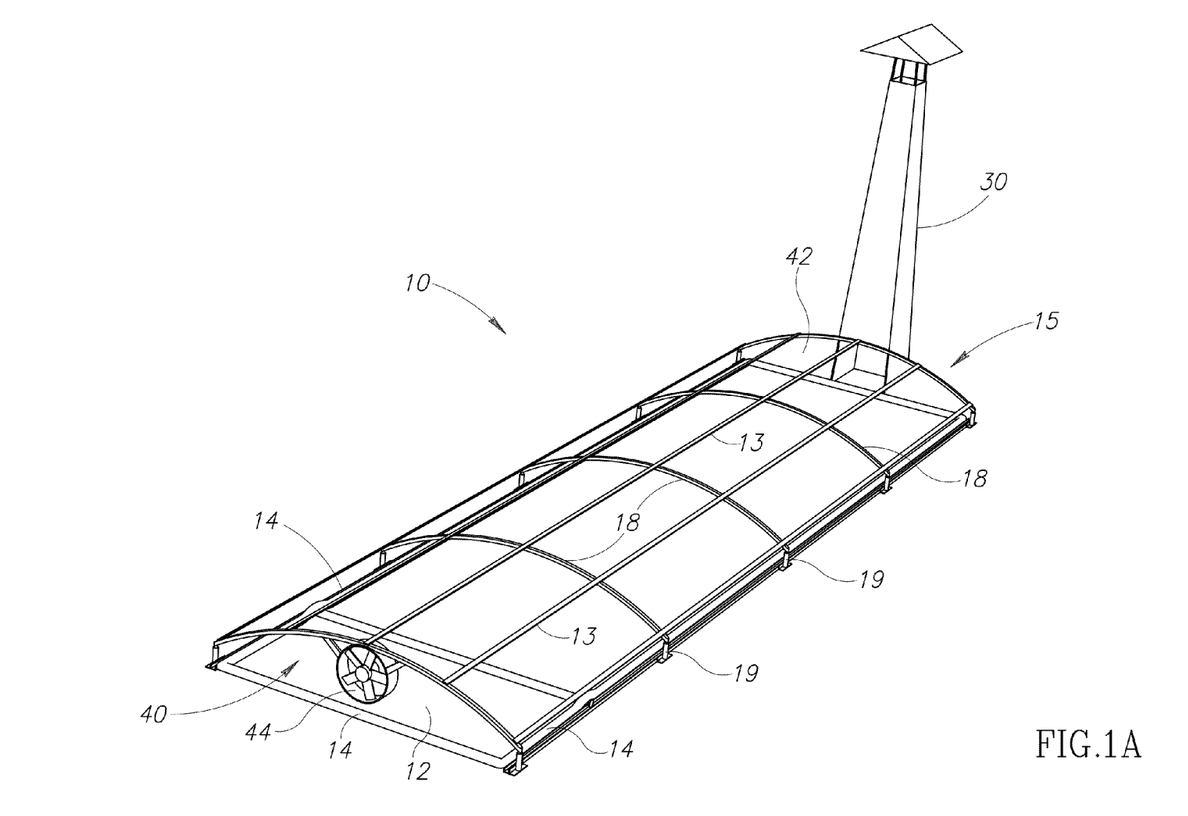
FIGS. 1A and 1B are schematic illustrations of a solar drying tunnel, without and with a cover, respectively, in accordance with embodiments of the present invention.
Figure 1B:
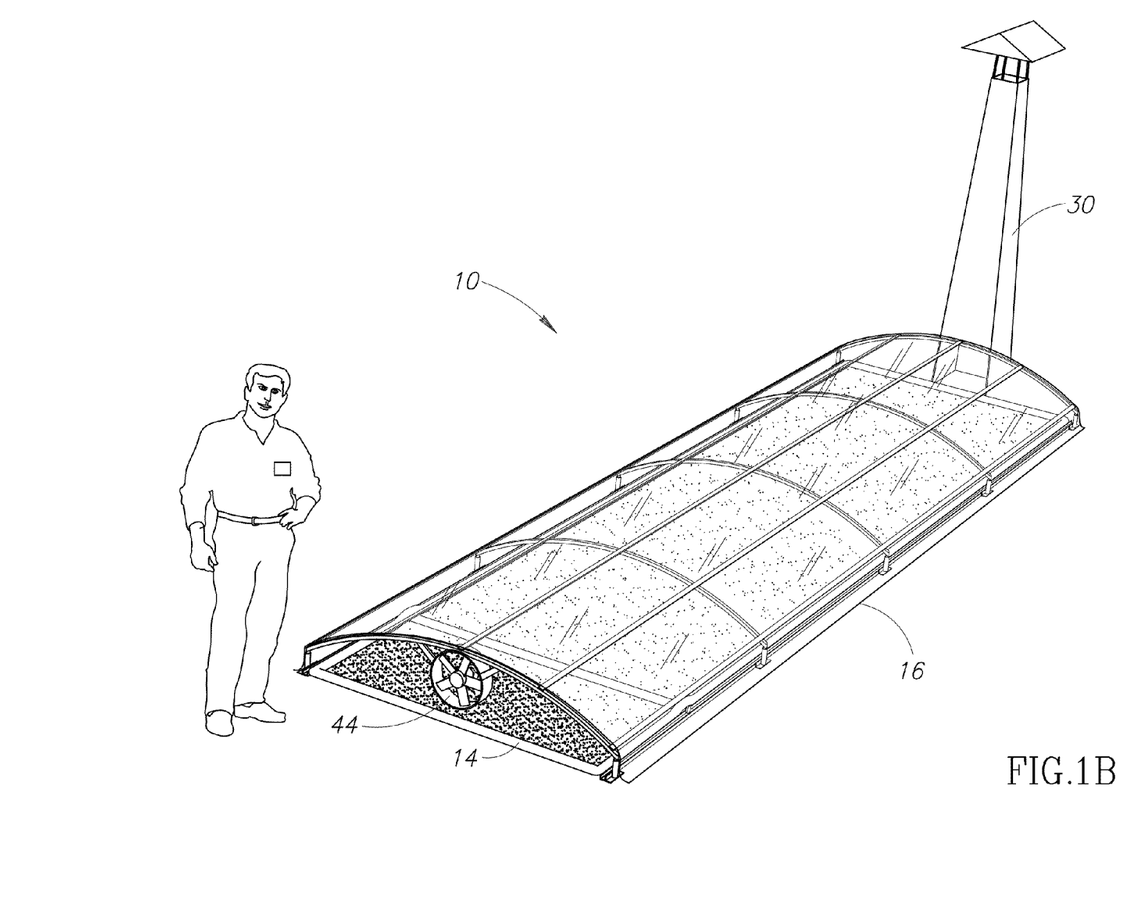

Reference is now made to FIGS. 1A and 1B, which are a schematic illustration of a solar drying tunnel 10, in accordance with embodiments of the present invention. Solar drying tunnel 10 is depicted in FIG. 1A without a cover and without grains therein, and is depicted in FIG. 1B with a cover and with grains therein. Solar drying tunnel 10 includes a bottom surface 12, side portions 14, and a frame 15, an open end 40 and a closed end 42. A view from open end 40 is further shown in FIG. 2. As shown in FIG. 1B, a cover 16 is positioned over frame 15. Bottom surface 12 is comprised of a flexible material, e.g., black plastic, such as black polyethylene (PE) or heavy-duty black reinforced Poly Vinyl Chloride (PVC), and is configured for placement of the grains or seeds thereon. Side portions 14 may be comprised of inflatable tubes, similar to walls of a raft, and are designed to prevent spillage. Alternatively, side portions 14 may be positioned as in the CDC, by positioning a lip around the tunnel and holding up the lip with pegs or another type of support mechanism.

Cover 16 is a transparent material that can protect the grains and seeds from rain, and also provides solar grain, also known as the "greenhouse effect", where incoming light is transmitted to heat the grain and the bottom black surface, and traps the heat generated by sunlight by being only slightly transparent to the infrared reradiated from the heated grain and heated bottom black surface. In some embodiments cover 16 is comprised of coated woven polypropylene. It should be readily apparent that other materials with good transparency to visible light and relatively opaque to infrared may be used as well. For example, transparent PE may be used for cover 16. It should be readily apparent that the invention is not limited to the examples listed herein and that any suitable transparent cover may be used.

Cover 16 is held up by frame 15. Frame 15 includes a series of rigid arches 18, which can have maximum heights of approximately 60 cm or less. In one embodiment, arches 18 are comprised of thin coated galvanized pipes. In other embodiments, arches 18 are semi-elliptical hoops without vertical walls, and are comprised of hollow PVC tubing, aluminum, or any other suitable material. In some embodiments, segments are designed for quick assembly in the field by snapping or screwing together.

Figure 2:
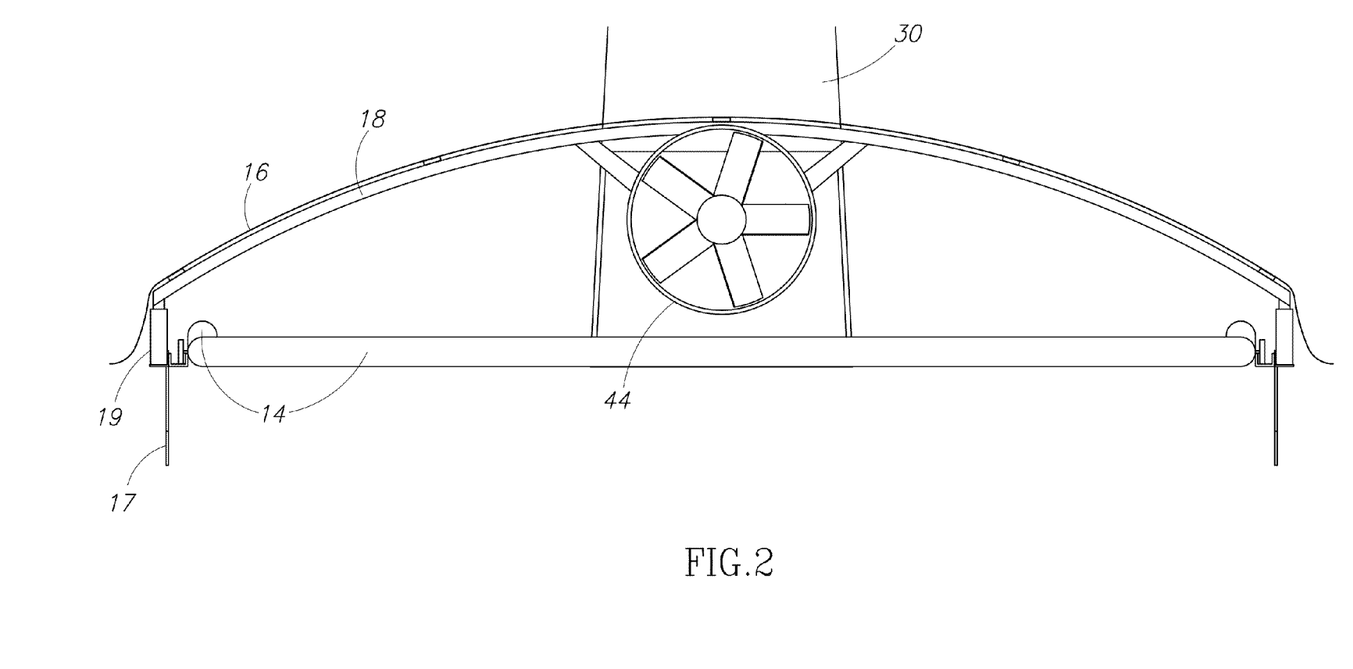
FIG. 2 is an illustration of the solar drying tunnel of FIGS. 1A and 1B, depicting a view from an open end of the solar drying tunnel.
Figures 3, 4:
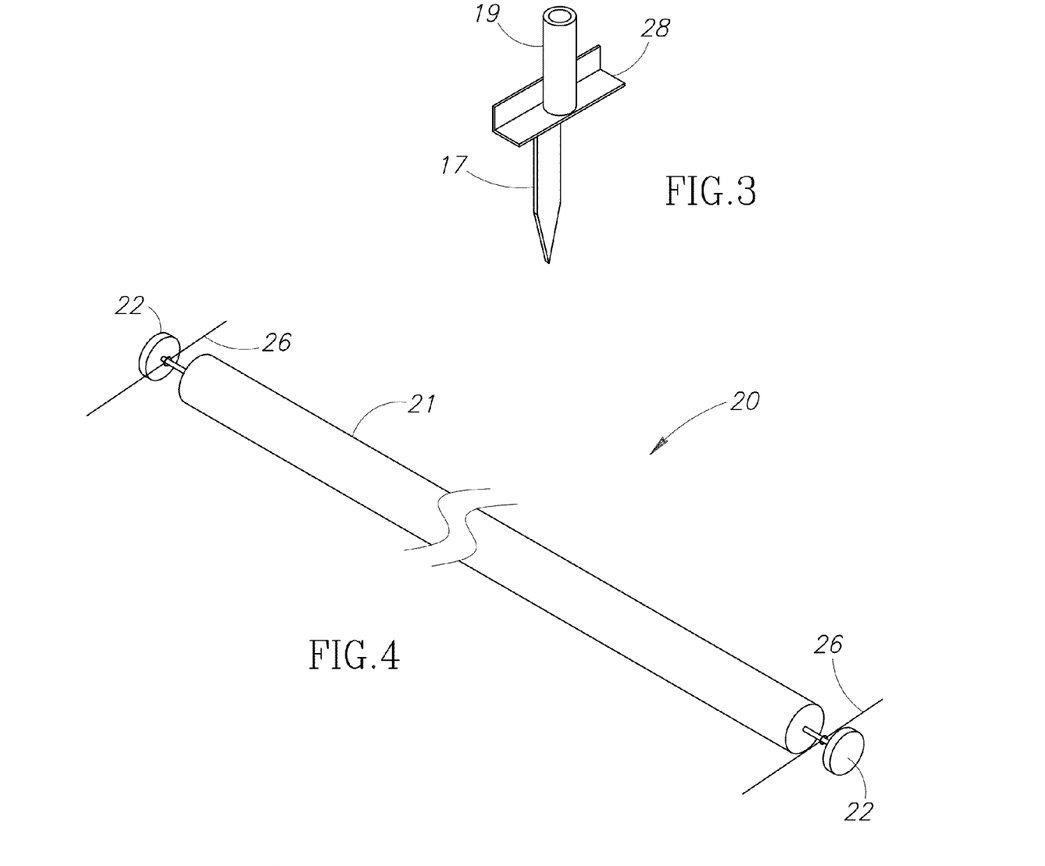
FIG. 3 is an illustration of holding pipes and pegs for holding a portion of a frame of the solar drying tunnel of FIGS. 1A and 1B.
FIG. 4 is an illustration of a rolling mechanism for placement under the solar drying tunnel of FIGS. 1A and 1B, in accordance with embodiments of the present invention.

Arches 18 are approximately 1 inch in diameter, although the dimensions may vary. Tunnel 10 for example, can be approximately 3 meters wide, and at least 15 meters long. Arches 18 are positioned approximately every 2 meters along the length of tunnel 10. Arches 18 may be inserted into holding pipes 19, which may be attached to pegs 17, as shown in FIG. 2 and FIG. 3. Pegs 17 may be driven into the ground with a mallet or hammer. Arches 18 may be attached to one another via attachment rods 13 for increased stability.

In some embodiments, solar drying tunnel 10 further includes a fan 44 positioned at open end 40. Fan 44, as depicted in FIG. 2, is used for blowing air across a length of tunnel 10 and may be used for increasing air circulation. In some embodiments, fan 44 can be activated via solar cells using solar panels. In some embodiments, fan 44 may be controlled with a thermostat to control air velocity and air temperature, to a predetermined maximum desired temperature. In some embodiments, fan 44 may be human-powered using a drive belt from a stationary bicycle. In some embodiments, a chimney 30 is located at closed end 42. Air blows through tunnel 10 and out through chimney 30. Alternatively, a ventilation exhaust tube may be used. In either case, air enters one end, and by convection flows across the tunnel; and as it is heated, it is exhausted through the chimney. This provides for quicker and more efficient drying of the grains and/or seeds.

Reference is now made to FIG. 3, which is an illustration of holding pipes 19 for holding bottoms of the tubes of arches 18. A contact rail 28 contacts the ground when peg 17 is driven into the ground. Holding pipe 19 stands on contact rail 28 and is above-ground. Holding pipes 19 are sized slightly larger than arches 18. For example, if arches 18 are comprised of 1 inch diameter tubes, holding pipes 19 may be 1.25 inches in diameter.

Unlike the CDC, there is no need to fold the drying sheet during rain or to provide a zipper to close the system, because transparent cover 16 provides rain protection as well as heat trapping.

Figure 8:
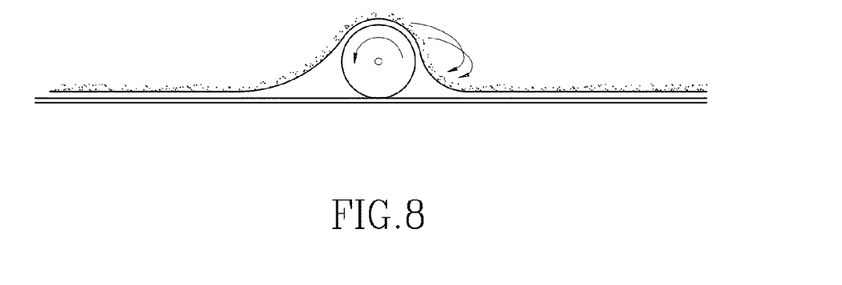
FIG. 8 is a schematic illustration of the rolling mechanism of FIG. 4, depicting grain in a process of being turned.

Reference is now made to FIG. 4, which is an illustration of a rolling mechanism 20 for placement under the solar drying tunnel of FIGS. 1A and 1B, in accordance with embodiments of the present invention, and to FIG. 8, which is a schematic illustration of the rolling mechanism 20 of FIG. 4, depicting grain in a process of being turned over. Solar drying tunnel 10 includes the rolling mechanism 20 for externally turning grain or seeds to facilitate drying. Rolling mechanism 20 is an external mechanism for creating a ridge in the bottom surface 12 thereby turning the grains, which enables a low profile design by eliminating the need for a human to enter the tunnel. Rolling mechanism 20 includes a roller bar 21 having wheels 22 at each end. Roller bar 21 may be, for example, a PVC pipe with approximately a 4 inch diameter. Rolling mechanism 20 is positioned under bottom surface 12 of tunnel 10. Roller bar 21 may be pulled manually from outside via a pulling mechanism 26 such as a rope on each side.

Figure 5:
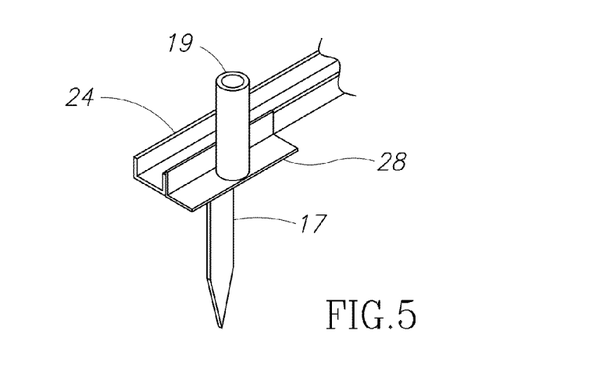
FIG. 5 is a schematic illustration depicting a rigid track for the rolling mechanism of FIG. 4.

Reference is now made to FIG. 5, which is a schematic illustration depicting a rigid track 24. In some embodiments, wheels 22 may run on rigid tracks 24 placed on the sides of tunnel 10, as depicted in FIG. 2 and in FIG. 5. Rigid tracks 24 may be lightweight tracks and are used to guide wheels 22, similar to ball bearings or roller bearings used in a desk drawer, for example. Track 24 may be attached to contact rail 28 which is attached to pegs 17, as shown in FIG. 5. Roller bar 21 may be pulled manually from outside via a pulling mechanism 26 such as a rope on each side. As roller bar 21 is pulled, it forms a moveable ridge in bottom surface 12, which causes the grain to tumble and turn over, facilitating uniform drying or exposure of all sides of the commodity to sunlight or air, as shown in FIG. 8.

For loading and unloading of grains and/or seeds, cover 16 may be lifted. Alternatively, grains or seeds may be introduced via flaps that are then re-attached to the base, as is common in greenhouse designs.

Figure 6:
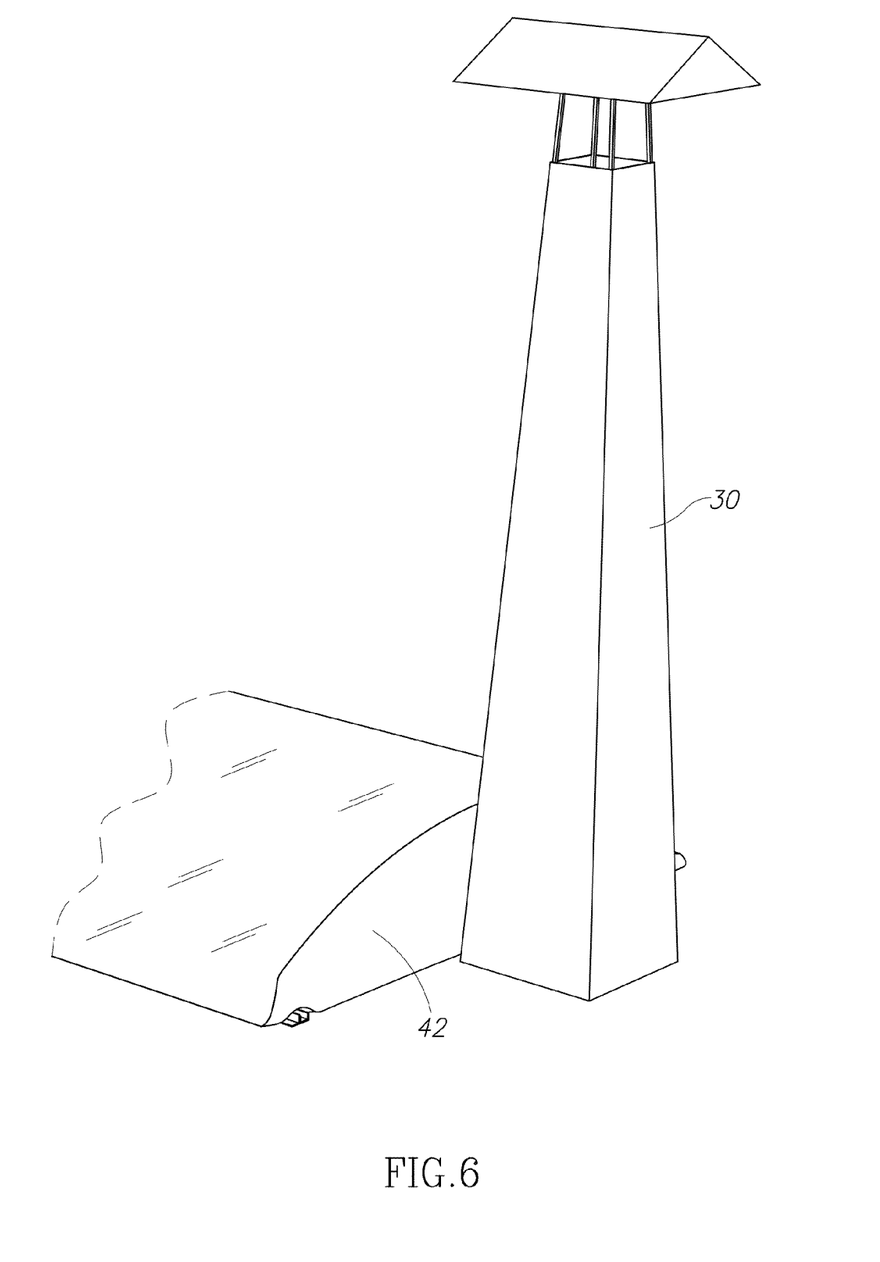
FIG. 6 is an illustration of a portion of the solar drying tunnel of FIGS. 1A and 1B, depicting a chimney positioned at a closed end, in accordance with embodiments of the present invention.

Reference is now made to FIG. 6, which is an illustration depicting chimney 30 positioned at closed end 42. Closed end 42 has an open portion leading into chimney 30. Chimney 30 is configured to pull air across solar drying tunnel 10 in order to further facilitate drying. Air blows through tunnel 10 via fan 44 and out through chimney 30. Alternatively, a ventilation exhaust tube may be used. In either case, air enters one end, and by convection flows across the tunnel; and as it is heated, it is exhausted through the chimney. This provides for quicker and more efficient drying of the grains and/or seeds.

Figure 7:
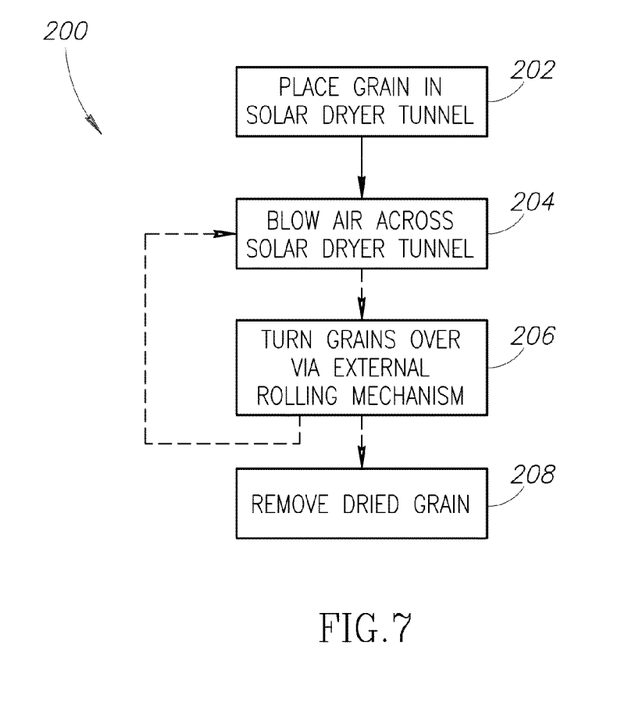
FIG. 7 is a flow-chart diagram of a method of drying grain, in accordance with embodiments of the present invention.

Reference is now made to FIG. 7, which is a flow-chart diagram of a method 200 of drying a commodity, for example, grain or seeds, in accordance with embodiments of the present invention. First, as an illustrative example, grains are placed (step 202) into a solar drying tunnel 10. In some embodiments, air is blown (step 204) across solar drying tunnel 10 to expedite the drying. After a period of time, grains are turned over (step 206) via an external rolling mechanism 20. The step of blowing air may be repeated and may in some embodiments be alternated with the step of turning grain. The step of turning grain may be done multiple times. In embodiments of the present invention, the period of time may range from one to several hours, and up to a day. In some cases, the period of time may be greater than a day. Grain, when determined to be dry, or dried to a specific level for the specific requirement, is then removed (step 208) from tunnel 10. In some embodiments, grain may be transported to a different location while retaining the grain within solar drying tunnel 10.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A solar drying tunnel for drying of a commodity, the tunnel comprising:
   a flexible bottom portion, said bottom portion having a width and length, said bottom portion having a first length end and a second length end, wherein said length extends from said first length end to said second length end and further having a first width end and a second width end, wherein said width extends from said first width end to said second width end, said bottom portion configured to receive the commodity thereon;
   a frame positioned at least at said first length end of the bottom portion, said frame extending vertically from said bottom portion to a frame height;
   a transparent cover disposed over said frame and further extending along said length of said bottom portion, such that said transparent cover is positioned above said bottom portion from said first length end to said second length end and from said first width end to said second width end; and
   an externally-controllable manual mechanism for turning the commodity by forming a moveable ridge in said bottom portion, wherein the commodity is a comprised of grains or seeds and wherein the moveable ridge causes the grains or seeds to turn over as said externally-controllable mechanism is operated.

2. The solar drying tunnel of claim 1, wherein said bottom portion is comprised of black material.

3. The solar drying tunnel of claim 1, further comprising inflatable side portions surrounding said bottom portion.

4. The solar drying tunnel of claim 1, wherein said frame height is less than or equal to 60 centimeters.

5. The solar drying tunnel of claim 1, wherein said width of said bottom portion is approximately 3 meters and said length of said bottom portion is approximately 15 meters.

6. The solar drying tunnel of claim 1, wherein said externally controllable mechanism comprises a roller bar having wheels at each end, and a pulling mechanism attached to said wheels for pulling said wheels and causing said roller bar to rotate underneath said bottom portion of said solar drying tunnel.

7. The solar drying tunnel of claim 6, further comprising a set of rigid tracks placed on two sides of said bottom portion, and wherein said wheels are positioned on said rigid tracks.

8. A solar drying tunnel for drying of a commodity, the tunnel comprising:
   a flexible bottom portion, said bottom portion having a width and length, said bottom portion having a first length end and a second length end, wherein said length extends from said first length end to said second length end, said bottom portion having a first width end and a second width end, wherein said width extends from said first width end to said second width end, said bottom portion configured to receive the commodity thereon;
   a frame positioned at least at said first length end of the bottom portion, said frame said frame extending vertically from said bottom portion to a frame height, wherein said frame height is less than or equal to 60 centimeters; and
   a transparent cover disposed over said frame and further extending along said length of said bottom portion, such that said transparent cover is positioned above said bottom portion from said first length end to said second length end and from said first width end to said second width end; and an externally-controllable manual mechanism for turning the commodity, wherein the commodity is comprised of grains or seeds and wherein said externally-controlled manual mechanism causes the grains or seeds to turn over during operation of said externally-controlled manual mechanism.

9. The solar drying tunnel of claim 8, further comprising wherein said externally-controllable manual mechanism comprises a mechanism for forming a moveable ridge in said bottom portion.

10. The solar drying tunnel of claim 8, wherein said bottom portion is comprised of black material.

11. The solar drying tunnel of claim 8, further comprising inflatable side portions surrounding said bottom portion.

12. The solar drying tunnel of claim 8, wherein said width of said bottom portion is approximately 3 meters and said length of said bottom portion is approximately 15 meters.

13. The solar drying tunnel of claim 8, wherein said externally controllable mechanism comprises a roller bar having wheels at each end, and a pulling mechanism attached to said wheels for pulling said wheels and causing said roller bar to rotate underneath said bottom portion of said solar drying tunnel.

14. The solar drying tunnel of claim 13, further comprising a set of rigid tracks placed on two sides of said bottom portion, and wherein said wheels are positioned on said rigid tracks.

15. The solar drying tunnel of claim 1, further comprising a fan attached to said frame at said first length end.

16. The solar drying tunnel of claim 8, further comprising a fan attached to said frame at said first length end.

\* \* \* \* \*